Figure 1:
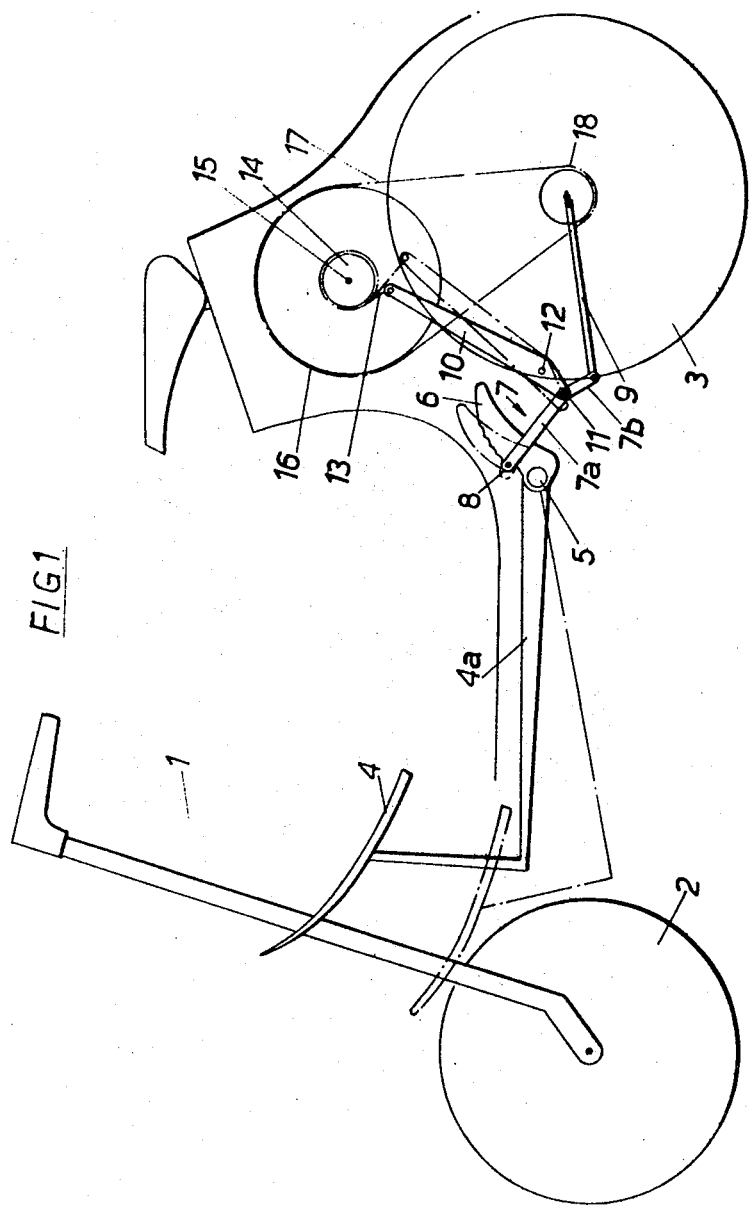

United States Patent

[11] 3,633,938

| [72] | Inventors | Arieh Solomon<br>Tel-Aviv;<br>Jecheskel Davidovitch, Ramat-Gan, both of Israel |
|---|---|---|
| [21] | Appl. No. | 17,592 |
| [22] | Filed | Mar. 9, 1970 |
| [45] | Patented | Jan. 11, 1972 |
| [73] | Assignee | The British & Foreign Tobacco Co., Ltd. London, England |
| [32] | Priority | Mar. 13, 1969 |
| [33] | | Great Britain |
| [31] | | 13,344/69 |

[54] TRANSMISSION MECHANISM
11 Claims, 3 Drawing Figs.

[52] U.S. Cl. ............................................. 280/255, 74/142, 280/246
[51] Int. Cl. ........................................................ B62m 1/04
[50] Field of Search ........................................ 280/246, 255, 220, 221, 253, 254, 244, 256, 257, 258; 74/142

[56] References Cited
UNITED STATES PATENTS

| 446,670 | 2/1891 | Elliott | 280/255 |
|---|---|---|---|
| 3,180,656 | 4/1965 | Gruenstein | 280/255 |
| 1,447,119 | 2/1923 | Brown | 280/254 |

FOREIGN PATENTS

| 634,468 | 8/1936 | Germany | 280/248 |
|---|---|---|---|
| 867,897 | 12/1941 | France | 280/257 |

*Primary Examiner*—Benjamin Hersh
*Assistant Examiner*—John P. Silverstrim
*Attorney*—Browdy and Neimark

ABSTRACT: This invention relates to a transmission mechanism for use in converting a reciprocal motion into a rotating motion and which is provided with means for adjusting the transmission ratio. The invention is particularly but not exclusively concerned with transmission mechanisms for use with vehicles, such as, for example, pedal-operated bicycles or the like.

TRANSMISSION MECHANISM

This invention relates to a transmission mechanism for use in converting a reciprocal motion into a rotating motion and which is provided with means for adjusting the transmission ratio. The invention is particularly but not exclusively concerned with transmission mechanisms for use with vehicles, such as, for example, pedal-operated bicycles or the like.

It is an object of the present invention to provide a new and improved transmission mechanism for use in converting a reciprocal motion into a rotating motion and provided with means for adjusting the transmission ratio.

According to the present invention there is provided a transmission mechanism for use in converting a reciprocal motion into a rotating motion comprising a pivoted drive lever adapted to be coupled to a rotatable element, a first pivoted coupling member adapted to be coupled to a reciprocatable element, a second coupling member pivotally coupled to the drive lever, a curved guide carried by one of the coupling members, a guide engager carried by the other coupling member and by means of which the coupling members are coupled together whereby the second coupling member is capable of displacement with respect to the first coupling member to and from the pivot point thereof and transmission ratio adjusting means coupled to the second coupling member so as to cause said displacement.

The adjusting means can be manually operated so that the transmission ratio can be changed at will and as desired. Alternatively the adjusting means can be automatically operated in accordance with the speed of the rotating motion. For example the adjusting means can comprise a speed governor mechanism responsive to the rotating motion.

Thus the manual or automatic operation of the adjusting means results in the displacement of the point of articulation of the two coupling members towards or away from the pivot point of the latter. As a consequence the pivotal motion of the reciprocatable element is accompanied by a decreased or increased pivotal stroke of the drive lever with a consequent decreased or increased drive speed of the rotatable element. With automatic adjusting means such as, for example, a speed governor mechanism self-adjustment of the transmission ratio is obtained.

When applied to a bicycle the curved lever is rigidly coupled to a reciprocatable pedal while the drive lever can be coupled to chain and sprocket drive mechanism arranged to drive the rear wheel of the bicycle. Thus, a reciprocating up and down movement of the pedal is effective in driving the bicycle and such reciprocating movement requires less effort than the conventional rotational movement of the pedals and is considerably more efficient in transmitting drive. Furthermore, the transmission ratio imparted to the driven wheel can be adjusted at will using a manually operated "gear change" mechanism or can be automatically adjusted in accordance with the speed attained and in accordance with the nature of the terrain (i.e., whether it is hilly or level), using, for example, a speed governor mechanism.

Figure 2:
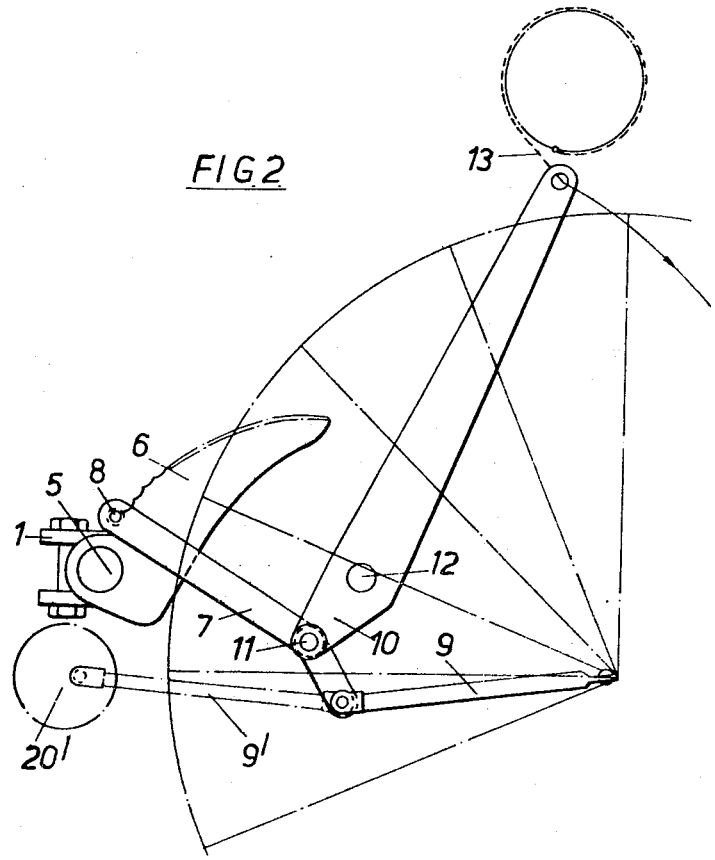
Figure 3:
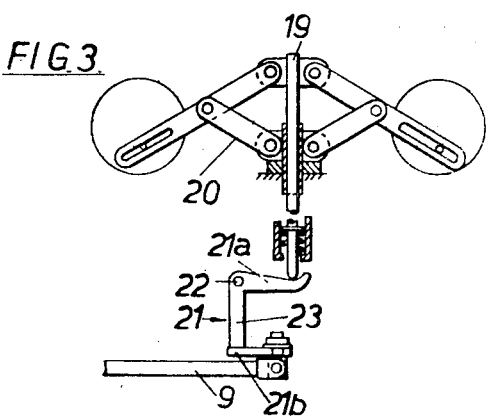

For a better understanding of the present invention and to show how the same can be carried out in practice, reference will now be made to the accompanying drawings, in which:

FIG. 1 is a schematic side elevation of a bicycle provided with a transmission mechanism in accordance with the present invention, FIG. 2 is a view of the transmission mechanism shown in FIG. 1 and seen on a larger scale, and FIG. 3 is a partially sectioned plan view of a centrifugal governor mechanism incorporated in the transmission mechanism shown in FIGS. 1 and 2.

As seen in FIG. 1 of the drawings a bicycle comprises a frame 1 and front and rear wheels 2 ans 3. A pair of reciprocatable pedals 4 is rigidly coupled via crank levers 4a with an axial pivot 5 which is journaled in the frame 1 of the bicycle. Rigidly mounted on the axial pivot 5 is a segment 6 constituting a first coupling member and having an upper scalloped edge constituting a guide. A coupling lever 7 constituting a second coupling member consists of a major portion 7a and a minor portion 7b. The free end of the major portion 7a carries a pin 8 constituting a guide engager which rides on the upper scalloped edge of the curved lever 6. A drive lever 10 is pivoted at an intermediate position thereof on a pivotal axle 12 journaled in the frame 1 of the bicycle and is pivotally coupled at one end thereof by means of a pivot pin 11 with the coupling lever 7 located at the join of the lever portions 7a and 7b.

A sprocket drive wheel 14 is mounted on an axle 15 journaled in the frame 1 of the bicycle in such a manner that the axle 15 rotates with the drive wheel 14 when the latter is rotated in an anticlockwise direction but the return movement of the drive wheel 14 in a clockwise direction is not accompanied by rotation of the axle 15, i.e., "overrunning" or free wheel action. The drive wheel 14 is provided with spring biasing means (not shown) so that its movement in an anticlockwise direction is against the spring biasing while its return movement in the clockwise direction is under the influence of the spring biasing. As an alternative to such spring biasing, rack and pinion operation may be employed.

Also mounted on the axle 15 so as to be rotatable therewith is a large sprocket wheel 16 which is coupled by means of a chain 17 with a small sprocket wheel 18 which is keyed to the shaft of the rear wheel 3.

One end of a chain 13 is connected to the end of the drive lever 10 remote from the pivot pin 11, the chain passing around most of the periphery of the sprocket wheel 14 and having its end, remote from the end coupled to the drive lever 10, anchored with respect to the sprocket wheel 14.

MOunted within the shaft of the rear wheel 3 is a speed governor mechanism 20 (see FIG. 3) of the known flyball kind. This mechanism includes a spindle 19 which is longitudinally displaceable with respect to the shaft of the rear wheel in response to the actuation of the governor mechanism 20 upon variation of speed of the rear wheel. The spring-biased free end of the spindle 19 (which is spring biased) bears against one end of a first limb 21a of a lever 21 having a second limb 21b and a web 23. The lever 21 is pivotally mounted on a pivot pin 22 at the corner between the limb 21a and web 23, and with respect to the frame 1. The free end of the limb 21 is pivotally coupled to one end of a connecting bar 9, the opposite end of which is pivotally coupled to the free end of the coupling lever portion 7b.

The operation of the bicycle transmission and drive mechanism will now be described. Starting from a position of rest of the bicycle the depression of the foot pedal 4 into its dotted line position results in the pivotal displacement of the curved lever 6 in an anticlockwise direction into the position thereof shown in dotted lines in the Figure. As a consequence the coupling lever 7 is upwardly displaced causing the drive lever 10 to pivot in a clockwise direction about its axle 12 into the position shown in dotted lines, thereby pulling the chain 13 downwardly and rotating the small sprocket wheel 14 against its spring biasing. This rotation of the small sprocket wheel 14 is accompanied by rotation of the axle 15 and as a consequence by a rotation of the large sprocket wheel 16. The rotation of the latter is transmitted to the sprocket wheel 18 by the chain 17 and as a result the rear wheel of the bicycle rotates.

When the foot pedal 4 has been fully depressed the removal of the depressing pressure by the cyclist will result in the foot pedal 4 being restored to its upper position under the influence of a restoring spring (not shown) as a consequence of which all the elements of the transmission and drive mechanism resume their positions as shown in full lines in the drawing with the consequent return rotation of the small sprocket wheel 14 on the axle 15 under the influence of the restoring spring. This return rotation, however, is not accompanied by a reverse rotation of the axle 15. Subsequent downward depression of the pedal 4 is again accompanied by an anticlockwise rotation of the sprocket wheel 14 and this rotation is transmitted in the manner described above to the rear wheel 3 of the bicycle. In this way the intermittent reciprocating motion of the pedal 4 is converted into a continuous rotation of the rear wheel 3 via an intermittent rotation of the small sprocket wheel 14.

As the speed of rotation of the rear wheel 3 increases the increasing outward displacement of the flyballs of the governor 20 results in the spindle 19 being longitudinally placed against its spring biasing against the end of the limb 21a of the lever 21 and as a consequence the latter pivots about its axial pivot 22. In consequence the connecting link 9 is longitudinally displaced thereby pivotally displacing the coupling lever 7 about its pivot pin 11. As a consequence the pin 8 rides up the scalloped edge of the segment 6 to a degree determined by the speed of the rear wheel and so as to be further and further displaced from the axial pivot 5 of the segment 6. (The curvature of the segment 6 is, in fact, determined, by the path of the pin 8.) This increased displacement of the pin 8 from the axial pivot 5 carries, as a consequence, the fact that when the pedal 4 is downwardly displaced and the segment 6 pivots about its axial pivot 5 the consequent pivotal stroke of the end of the lever 10 coupled to the chain 13 is correspondingly increased. As a result the sprocket wheel 14 is subjected to an increased rotation for every downward depression of the pedal 4 and in this way the speed of rotation of the rear wheel 3 increases for the same depression of the pedal 4.

In this way the transmission ratio of the bicycle transmission mechanism is self-adjusting in accordance with the speed attained by the bicycle and this will also be reflected when travelling up hill, the reduction in speed resulting in a lowering of the rear wheel speed for the same pedal depression and consequently an increase in the transmitted power.

The provision of the segment 6 with an upper scalloped edge ensures that the pin 8 does not slip on the lever 6 during movement of the pedal.

While in the embodiment specifically described, the transmission ratio self-adjustment is attained via a flyball governor 20 whose actuating spindle 19 acts on a connecting link 9 via a lever 21, any other suitable form of speed responsive mechanism can be employed which can be actuated by either the motion of the front or rear wheels and which can be coupled in any suitable manner with the connecting link. Thus, for example, as shown in chain-dotted lines in FIG. 2 of the drawings, an alternative speed responsive mechanism 20' can be directly coupled by means of a connector bar 9' with the coupling lever 7.

Furthermore, while in the embodiment specifically described above the first coupling member (in the form of the curved lever 6) carries the cam surface in the form of the curved edge while the second coupling member (namely the coupling lever 7) carries the cam follower (in the form of the pin 8) this arrangement can, if desired, be reversed.

It will furthermore be realized that the transmission mechanism which has been specifically described is capable of use with other forms of drive mechanism other than the chain and sprocket drive mechanism specifically described. In general the transmission mechanism in accordance with the invention can be applied to vehicles other than bicycles such as, for example, motorized vehicles and can be in fact used with other forms of machinery where a reciprocatory motion is to be converted into a rotary motion and where a self-adjusting or manually adjustable transmission ratio is required.

Alternatively manual adjustment of the transmission ratio can be effected for example by providing a gear change lever which is coupled to the coupling lever 7 and by means of which appropriate displacement of the coupling lever can be achieved.

We claim:

1. A transmission mechanism for converting reciprocating motion to rotating motion comprising;
   a. a frame;
   b. a drive lever pivotally mounted on said frame for pivotal displacement and adapted to be connected to a rotatable element;
   c. a first coupling member pivotally mounted on said frame for pivotal displacement, and adapted to be connected to a reciprocable element;
   d. a second coupling member pivotally connected to said drive lever; and
   e. connection means interconnecting the coupling members for converting displacement of said first coupling member into displacement of said drive lever;
   f. said connection means comprising a curved guide on one of said members in the form of a curved edge, and a guide engager on the other of said members in the form of a pin engaged with said curved guide.

2. A transmission mechanism according to claim 1 including transmission adjusting means connected to said second coupling member to maintain said guide engager in selective operative engagement with said guide for establishing the ratio between the displacement of said first coupling member and displacement of said drive lever.

3. A transmission mechanism according to claim 2 wherein said adjusting means includes a speed responsive mechanism responsive to rotation of said rotatable element for functionally relating said ratio of displacement to the speed of the rotatable element.

4. A transmission mechanism according to claim 3 wherein said speed responsive mechanism includes a spindle which is displaceable in accordance with said speed and is pivotally coupled to said second coupling member via a connecting link.

5. A transmission mechanism according to claim 3 wherein said speed responsive mechanism includes a flyball governor.

6. A pedal-operated cycle according to claim 3 and having a wheel shaft, and wherein said drive mechanism comprises a first sprocket wheel mounted on an axle so as to be rotatable with the axle in one sense and to be capable of rotation with respect to the axle in the opposite sense, a second sprocket wheel keyed to said axle, a third sprocket wheel keyed to said wheel shaft of the cycle and coupled to the second sprocket wheel by means of a dive chain, said drive lever being coupled to one end of a further chain which passes around the first sprocket wheel and is secured thereto at its other end.

7. A transmission mechanism according to claim 2 wherein said second coupling member is pivotally coupled at an intermediate position thereof to said drive lever, carries said pin at one end thereof and is pivotally coupled at an opposite end thereof to said adjusting means.

8. A transmission mechanism according to claim 2 wherein said adjusting means comprises manually operated means whereby the transmission ratio can be adjusted at will.

9. A pedal-operated cycle according to claim 2 wherein said adjusting means comprises speed responsive mechanism accommodated within a wheel shaft.

10. A pedal-operated cycle provided with a transmission mechanism according to claim 1 and including a reciprocatable foot pedal that constitutes a part of said reciprocable element, a sprocket and chain drive mechanism that constitutes part of said rotatable element, means connecting said first coupling member to said reciprocatable foot pedal, and means connecting said drive lever to said sprocket and chain drive mechanism.

11. A transmission mechanism according to claim 1 wherein said curved edge is scalloped.

* * * * *